United States Patent Office 3,598,521
Patented Aug. 10, 1971

3,598,521
REMOVAL OF SULFUR COMPOUNDS FROM GAS STREAMS
Forrest C. Alley, Clemson, S.C., assignor to Westvaco Corporation
No Drawing. Filed Dec. 11, 1968, Ser. No. 783,150
Int. Cl. B01d *53/04, 53/34*
U.S. Cl. 23—25                                    7 Claims

ABSTRACT OF THE DISCLOSURE

A process for removing malodorous organic sulfur compounds and hydrogen sulfide from industrial gas streams which comprises contacting the sulfur compound-containing gas and an oxygen-containing gas with a carbonaceous adsorbent wherein the relative humidity at initial contact is at least 70 percent and the contact temperature is between 27° C. and 82° C., whereby the organic sulfur compounds and hydrogen sulfide are adsorbed, or oxidized and adsorbed onto the carbonaceous adsorbent, and the gas stream is passed to the atmosphere free from the organic sulfur compounds and hydrogen sulfide.

---

This invention relates to a process for removing certain sulfur compounds from gas streams by adsorption onto a carbonaceous adsorbent. More specifically, this invention relates to removing organic sulfur compounds and hydrogen sulfide from industrial waste gas streams by oxidizing certain of the sulfur compounds and adsorbing all the organic sulfur compounds and hydrogen sulfide onto an activated carbon adsorbent. The adsorbent may then be regenerated for reuse and the gas stream passed to the atmosphere free from organic sulfur compounds and hydrogen sulfide as elemental sulfur pollution.

In the pulping of wood by the kraft process sulfur compounds in the pulping liquor react with the wood to form various organic sulfur compounds and to liberate hydrogen sulfide. These organic sulfur compounds and hydrogen sulfide escape to the atmosphere at a number of points in the handling of the pulp and in the recovery of valuable chemicals from the residual pulping liquors. Sulfur losses due to evolution of these sulfur compounds, both organic and inorganic, run in the hundreds of pounds per day in each mill. The malodorous sulfur compounds are evolved, among other places, at the digesters and multiple-effect evaporator heat recovery systems. A substantial amount of these organic sulfur compounds include methyl mercaptan, dimethyl sulfide, and dimethyl disulfide. Other organic sulfur compounds found in lesser proportions include ethyl sulfide, isopropyl mercaptan, n-propyl mercaptan and butyl mercaptan. A substantial amount of hydrogen sulfide is also present in the waste gases.

Evolution of malodorous sulfur compound-containing waste gases is by no means limited to the pulping industry. For instance, it is common to remove the odorous sulfur compounds during the production of gasoline.

Several prior attempts have been made to remove the malodorous sulfur compounds from gas streams by adsorption of these sulfur compounds onto activated carbon; however, various difficulties have prevented complete removal. For example, adsorption of methyl mercaptan onto activated carbon is comparatively low; therefore, prior processes for removing methyl mercaptan from waste gases have oxidized the methyl mercaptan to dimethyl disulfide. Dimethyl disulfide is more easily adsorbed onto activated carbon, and is not as odorous as methyl mercaptan. Prior attempts at organic sulfur compound removal have been either inefficient (see German Pats. 708,993 and 702,605) or require specially impregnated adsorbents (see U.S. Pat. 3,391,988).

It is a general object of this invention to provide a process for adsorbing certain sulfur compounds from industrial gas streams whereby the sulfur compounds are selectively removed from the gas stream and the gases free from these sulfur compounds are vented to the atmosphere. A more specific object of this invention is to remove organic sulfur compounds and hydrogen sulfide from waste gas streams by adsorption onto a carbonaceous adsorbent. A further object is to provide a process for removing organic sulfur compounds and hydrogen sulfide from pulp mill waste gases by oxidation of lower alkyl mercaptans to their corresponding dialkyl disulfides, and hydrogen sulfide to sulfur, and adsorbing all the disulfides and sulfur onto an activated carbon adsorbent. Other objectives of the present invention will be apparent to those skilled in the art from the following disclosure.

It has been found that both certain organic sulfur compounds, primarily mercaptans and disulfides, and hydrogen sulfide may be completely and economically removed from waste gas streams by contacting a gas stream of the sulfur compound-containing gas and an oxygen-containing gas with an activated carbonaceous catalytic adsorbent when the initial contact relative humidity is at least 70 percent at a temperature between 27° C. and 82° C. Oxidation of the organic sulfur compounds contemplated, i.e., methyl mercaptan, is represented by reaction [1], and oxidation of hydrogen sulfide is represented by reaction [2].

[1] 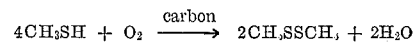

[2] 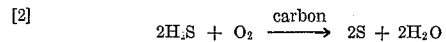

The dialkyl disulfides formed by reaction [1] and the sulfur formed by reaction [2] adsorb onto the carbonaceous adsorbent and are hereinafter referred to collectively as the adsorbate. The organic sulfur compounds oxidized and adsorbed by this invention are primarily mercaptans, particularly methyl mercaptan, ethyl mercaptan, and isopropyl mercaptan. Other organic sulfur compounds, such as the sulfides and disulfides, are physically adsorbed directly onto the carbon adsorbent.

The oxygen-containing gas may be pure oxygen, or an oxidizing gas containing free oxygen, such as air. There must be at least two percent by volume of oxygen for the reaction to occur efficiently; however, the reaction will occur if only stoichiometric amounts of the reactants are present. Although the reasons are not fully understood, it is believed necessary to maintain two percent by volume of oxygen because the reactions are rate or equilibrium controlled. Sufficient oxygen necessary for the reaction is normally present in most waste gas streams, but where the oxygen content is less than two percent by volume additional oxygen is added to the stream for an efficient reaction rate to be maintained.

If the initial contact relative humidity is permitted to go below 70%, all the mercaptan will not be oxidized to disulfide and hydrogen sulfide oxidized to sulfur, and there will be a leakage of both mercaptan and hydrogen sulfide through the carbonaceous adsorbent and the effluent gas stream will be unsatisfactory from an air pollution standpoint. The initial contact relative humidity is the relative humidity of the inlet gas stream as it contacts the carbonaceous adsorbent bed. The absolute humidities used correspond to a relative humidity of 70 percent over the acceptable temperature range. It is thought that the presence of the required amount of water vapor in the inlet gas stream serves to provide rapid oxidation and adsorption of the sulfides in the catalyzed reactions.

Although reactions [1] and [2] will occur at room temperature, they preferably take place when the inlet gas stream contacts the carbonaceous adsorbent between about 27° C. and 82° C. The initial contact absolute humidity at 27° C. is at least 0.02 pound of water vapor per pound of dry air and at 82° C. the absolute humidity is at least 0.35 pound of water vapor per pound of dry air. A more preferred inlet temperature is between 32° C. and 54° C. at which the absolute humidities must be at least 0.02 lb. $H_2O$/lb. of dry air, and 0.06 lb. $H_2O$/lb. dry air, respectively. At inlet temperatures below 27° C. the reactions do not proceed rapidly enough to be effective. At inlet temperatures above 82° C. the ability of the carbonaceous adsorbent to hold the dialkyl disulfides is impaired. Since the reaction are exothermic, the temperature within the adsorption bed may rise as much as 30° C. above the inlet contact temperature.

Activated carbon physically adsorbs little alkyl mercaptan at reaction temperatures and removal of mercaptans from exhaust gas streams depends upon the carbon acting as a catalyst in the presence of at least 70% relative humidity to oxidize the alkyl mercaptan to its corresponding dialkyl disulfide by providing improved conversion to the disulfide and adsorption onto the carbon. For instance, oxidation of methyl mercaptan by reaction [1] raises the adsorption capacity of activated carbon from some 2 to 3 grams of adsorbed mercaptan per 100 grams of carbon to 25 to 30 grams of adsorbed dimethyl disulfide per 100 grams of carbon.

The catalyst adsorbents contemplated by this invention include any carbonaceous adsorbent. However, due to adsorbing characteristics of various carbonaceous adsorbents, it has been found that a highly activated granular coal-based carbon is preferred. Typical of the preferred carbons are bituminous coal-based carbons exhibiting large adsorption capacity and rate characteristics. Among activated carbons exhibiting these characteristics are those bituminous carbons having a surface area of 800–1000 m.$^2$/gm., and an abrasion number of at least 70. Other carbonaceous adsorbents include, for example, lignite, activated char and activated carbons derived from sources other than coal.

The adsorbate may be removed from the carbonaceous adsorbent and the adsorbent regenerated by a variety of methods. In a preferred regenerating method the carbonaceous adsorbent is contacted with steam at elevated temperatures to strip dialkyl disulfides and sulfur from the carbon. It is understood, of course, that this regeneration process strips other adsorbed inorganic and organic sulfides, which have been physically adsorbed on the adsorbent. The regeneration may be effectively carried out by passing 1.0 to 35.0 p.s.i.g. steam, preferably 1.0 to 1.5 p.s.i.g., at 125° C. to 316° C. through the carbonaceous adsorbent. When the adsorbate includes sulfur the carbon adsorbent must be heated above 290° C. for effective sulfur removal. Other regeneration methods include, passing nitrogen through the adsorbent bed at elevated temperatures, and washing the adsorbent bed with a suitable solvent. The regenerated carbonaceous adsorbent is then returned to the adsorber for reuse, without losing its effective adsorbing capacity or rate characteristics and the adsorbate recovered.

The disulfides recovered during regeneration by steam from dilute solutions of from 10% to 50% by weight disulfides. The disulfides are then separated from the steam after condensation, purified, and sold. When the adsorbate contains sulfur the separated condensate containing elemental sulfur is similarly processed.

Adsorption may be carried out in a variety of methods, such as, fixed bed, continuous bed or fluidized bed. Essentially all of the organic sulfur compounds and hydrogen sulfide may be adsorbed before the gas stream is exhausted to the atmosphere. The gas stream as it passes to the atmosphere may be reduced to 5 p.p.m., of organic sulfur compounds and hydrogen sulfide from initial concentrations of 10,000 p.p.m., but economics dictate that 90% of the sulfur compounds be normally removed from the gas stream.

The advantages offered by this invention include the improved ability to efficiently remove malodorous organic sulfur compounds and hydrogen sulfide from waste gas streams and at the same time emit waste gases free of these compounds to the atmosphere; as well as, recovering saleable dialkyl disulfides and sulfur. A second advantage is the ability to use a carbonaceous catalytic adsorbent in the presence of only at least 70 percent relative humidity. An additional advantage is that this process may be carried out in either a fixed bed or in a continuous manner, such as, a fluidized bed.

The practice of this invention may clearly be seen in the following examples.

EXAMPLE 1

Removal of methyl mercaptan from a gas stream was carried out in a one and one-half inch cylindrical adsorber charged with approximately 200 grams of a hard granular activated carbon. A gas stream containing methyl mercaptan and air was passed at a flow rate of 0.5 cubic feet per minute through the reactor. The inlet concentration of methyl mercaptan was approximately 2500 parts per million. The inlet contact temperature average was approximately 28° C. and the humidity was 0.02 lb. $H_2O$/lb. dry air (70% relative humidity). Disulfide and mercaptan concentrations in the effluent from the reactor were continuously determined with a gas chromatograph. Dimethyl disulfide was collected on the activated carbon adsorbent for a period of 8 hours without passing through the reactor. During this time no methyl mercaptan broke through the adsorber bed. Even after dimethyl disulfide breakthrough, all the mercaptan continued to be converted to disulfide.

EXAMPLE 2

A mixture of methyl mercaptan and hydrogen sulfide was removed from an oxygen-containing gas stream in a one and one-half inch diameter cylindrical adsorber charged with approximately 230 grams of a hard granular activated carbon. The gas stream was passed upward through the adsorber bed at a flow rate of 0.72 cubic feet per minute (superficial linear velocity, approximately 1.0 ft./sec.). The inlet concentration of methyl mercaptan was 5200 parts per million, and the inlet concentration of hydrogen sulfide was 3200 parts per million. The average initial contact temperature was 46° C. The inlet absolute humidity was 0.07 lb. water/lb. dry air, or about 90 percent relative humidity. Methyl mercaptan and hydrogen sulfide concentrations in the effluent gas stream were continuously determined with a gas chromatograph. Dimethyl disulfide initially passed through the adsorber bed after 3½ hours, and initial hydrogen sulfide breakthrough occurred after 4½ hours. No methyl mercaptan had broken through after 5½ hours indicating complete conversion to dimethyl disulfide.

EXAMPLE 3

In order to compare the effect of humidity on methyl mercaptan and hydrogen sulfide removal, a second mixed gas stream similar to that of Example 1 was run, except that the initial contact humidity was 0.002 lbs. $H_2O$/lb. dry air (a relative humidity of approximately 12%). The average initial contact temperature was approximately 43° C. Hydrogen sulfide passed through the adsorber bed almost immediately and methyl mercaptan came through after only 35 minutes without reacting or being adsorbed, thereby indicating the necessity of maintaining at least a 70% relative humidity level.

EXAMPLE 4

It was desired to remove the sulfur compounds from the digester blow gases in a kraft pulp mill. Analysis of a typical digester blow gas stream showed the gas stream may first be used for heat recovery, which considerably lowers the volume of gas to be processed and increases the odorous sulfur compound gas concentrations. A simulated gas stream, typifying a digester blow gas stream after heat recovery and having the following composition, was passed through the adsorber.

| Component: | Concentration P.p.m. | Vol. percent |
|---|---|---|
| Methyl mercaptan | 5,200 | |
| Hydrogen sulfide | 3,100 | |
| Dimethyl sulfide | 1,900 | |
| Turpentine | | [1] 0.18 |
| Water vapor | | 13.6 |
| Air | | 85.6 |

[1] Cc./ft.$^3$.

The adsorption column had a 1½ inch diameter and under operating conditions the column was packed with 232 grams of hard granular activated carbon and provided a bed depth of 14 inches. The simultated blow gas stream was passed upward through the fixed carbon bed at an inlet temperature of 47° C. and an absolute humidity of 0.07/lb. H$_2$O/lb. dry air (relative humidity approximately 100%) at a superficial linear velocity of 1.0 ft./sec. Sulfur compound concentrations in the effluent gas stream were determined by a gas chromatograph. The gas stream was passed through the bed for 2 hours and 45 minutes, during which time no methyl mercaptan had broken through the carbon bed. Dimethyl disulfide breakthrough did not occur until after 2 hours and 15 minutes. Dimethyl sulfide reached 20% breakthrough after 46 minutes, and hydrogen sulfide breakthrough never reached 20%. The presence of turpentine in the inlet gas stream did not affect the reactions or adsorption.

EXAMPLE 5

The saturated carbon adsorbent from Example 4 having dimethyl disulfide and sulfur adsorbed thereon was regenerated by passing 1.0 p.s.i.g. steam superheated to 295° C. through the adsorbent. After two hours dimethyl disulfide was effectively removed from the adsorbent. The total volume of condensate collected during regeneration was 4.0 liters. The sulfur concentration in the condensate was roughly 0.2 percent.

While the invention has been described herein by references to various specific materials, procedures, and examples, it is understood that the invention is not restricted to the particular materials, combinations of materials, and procedures selected for that purpose. Numerous variations of such details can be employed, as will be appreciated by those skilled in the art.

I claim:
1. A process for continuously removing from an oxygen-containing gas stream hydrogen sulfide and at least one sulfur compound selected from the group consisting of lower alkyl mercaptans which comprises; contacting said gas stream at a temperature between 27° C. and 82° C. and a relative humidity of at least 70% with a carbonaceous adsorbent to oxidize said hydrogen sulfide and sulfur compound, and adsorbing said oxidized hydrogen sulfide and sulfur compound onto said carbonaceous adsorbent.

2. The process of claim 1 wherein said carbonaceous adsorbent is activated carbon.

3. The process of claim 1 further comprising regenerating said carbonaceous adsorbent; and recovering said adsorbed sulfur compounds.

4. The process of claim 3 wherein said regeneration comprises passing steam through said carbonaceous adsorbent.

5. A process for removing a lower alkyl mercaptan from an oxygen-containing gas stream comprising;
(a) contacting said gas stream with a carbonaceous adsorbent at a relative humidity of at least 70% and a temperature between 27° C. and 82° C. to oxidize said lower alkyl mercaptan to dialkyl disulfide,
(b) adsorbing said disulfide onto said carbonaceous adsorbent,
(c) removing the thus contacted gas stream free of lower alkyl mercaptan and dialkyl disulfide,
(d) regenerating said carbonaceous adsorbent,
(e) recovering dialkyl disulfide, and
(f) returning said carbonaceous adsorbent into contact with said gas stream.

6. The process of claim 5 wherein said carbonaceous adsorbent is activated carbon.

7. The process of claim 5 wherein said lower alkyl mercaptan is methyl mercaptan.

References Cited
UNITED STATES PATENTS

| 1,479,852 | 1/1924 | Englehardt | 23—2 |
| 2,671,722 | 3/1954 | Sweetser et al. | 23—3X |
| 3,284,158 | 11/1966 | Johswich | 23—3X |
| 3,416,293 | 12/1968 | Alexander | 23—2X |
| 1,984,971 | 12/1934 | Herold et al. | 23—225 |
| 2,859,249 | 11/1958 | Haimsohn et al. | 260—608 |

EARL C. THOMAS, Primary Examiner

U.S. Cl. X.R.

23—181, 225P; 55—73; 260—608

PO-1050
(5/69)

UNITED STATES PATENT OFFICE
CERTIFICATE OF CORRECTION

Patent No. 3,598,521   Dated August 10, 1971

Inventor(s) Forrest C. Alley

It is certified that error appears in the above-identified patent and that said Letters Patent are hereby corrected as shown below:

Column 1, line 36, the phrase "as elemental sulfur" should be deleted and inserted after the word "sulfide" in line 33 same column.

Column 3, line 30, "catalyst" should read -- catalytic --.

Signed and sealed this 28th day of March 1972.

(SEAL)
Attest:

EDWARD M. FLETCHER, JR.
Attesting Officer

ROBERT GOTTSCHALK
Commissioner of Patents